US010242297B2

(12) United States Patent
Aiyoshi

(10) Patent No.: US 10,242,297 B2
(45) Date of Patent: Mar. 26, 2019

(54) CARD READER

(71) Applicant: NIDEC SANKYO CORPORATION, Suwa-gun, Nagano (JP)

(72) Inventor: Hiroyuki Aiyoshi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/497,350

(22) Filed: Apr. 26, 2017

(65) Prior Publication Data

US 2017/0316288 A1    Nov. 2, 2017

(30) Foreign Application Priority Data

Apr. 27, 2016   (JP) ................. 2016-088728

(51) Int. Cl.
*G06K 7/08*  (2006.01)
*G06K 13/08* (2006.01)

(52) U.S. Cl.
CPC ........... *G06K 13/085* (2013.01); *G06K 7/087* (2013.01)

(58) Field of Classification Search
CPC .... G06K 7/087; G06K 13/085; G06K 9/0002; G06K 9/00053; G06K 9/00087; G07F 19/2055; G07F 19/209; G04R 60/12; G06F 21/31; G06F 21/32
USPC ........................................................ 235/449
See application file for complete search history.

(56) References Cited

U.S. PATENT DOCUMENTS

| 8,556,168 | B1 * | 10/2013 | Lewis ................ G07F 19/2055 235/379 |
| 8,640,947 | B1 * | 2/2014 | Lewis .................. G07F 19/209 235/379 |
| 9,767,422 | B2 * | 9/2017 | Ray ........................ G06Q 10/06 |
| 2002/0071346 | A1 * | 6/2002 | Paratte .................. G04G 21/04 368/10 |
| 2014/0158768 | A1 * | 6/2014 | Ray ........................ H04K 3/825 235/449 |
| 2014/0372305 | A1 * | 12/2014 | Ray ........................ G06Q 10/06 705/44 |
| 2016/0125207 | A1 * | 5/2016 | Aiyoshi ............... G06K 7/0004 235/440 |

FOREIGN PATENT DOCUMENTS

JP          2011040029 A       2/2011

* cited by examiner

*Primary Examiner* — Thien M Le
(74) *Attorney, Agent, or Firm* — Cantor Colburn LLP

(57) ABSTRACT

A card reader may include a main body frame having a card passage, and a bezel which having a card insertion port and attached to a front end side portion of the main body frame. In a case that a width direction of the card is referred to as a first direction and a portion of the main body frame which is covered by the bezel is referred to as a frame front end part, the bezel includes width direction cover parts respectively covering both sides in the first direction of the frame front end part, both ends in the first direction of the frame front end part are opened, and the frame front end part is structured so that side faces in the first direction of the card passage are structured by the width direction cover parts of the bezel which serve as guide faces for a card.

13 Claims, 6 Drawing Sheets

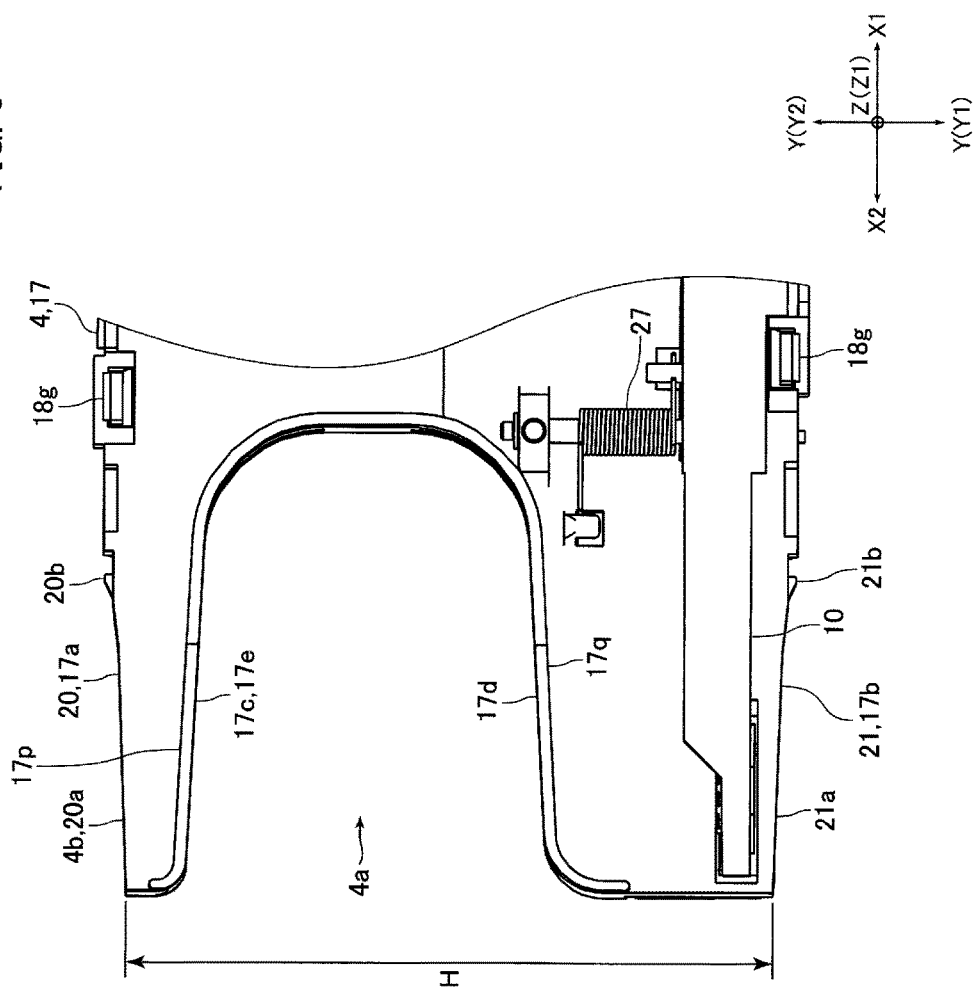

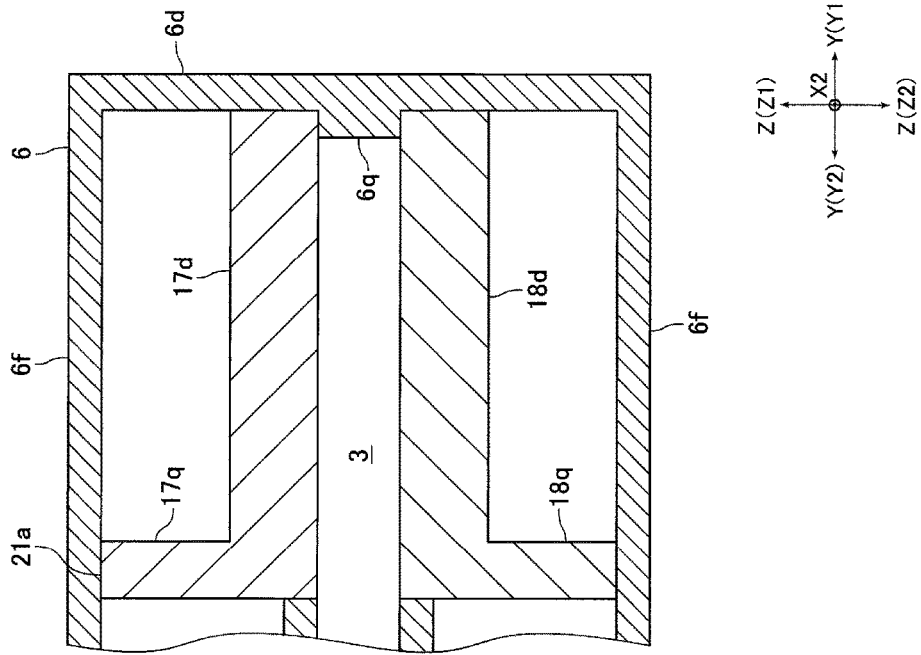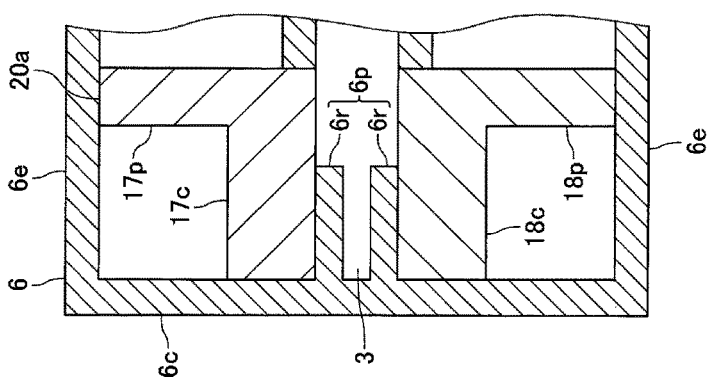

CARD READER

CROSS REFERENCE TO RELATED APPLICATION

The present invention claims priority under 35 U.S.C. § 119 to Japanese Application No. 2016-088728 filed Apr. 27, 2016, the entire content of which is incorporated herein by reference.

FIELD OF THE INVENTION

At least an embodiment of the present invention may relate to a card reader comprising a bezel formed with a card insertion port.

BACKGROUND

Conventionally, a manual type card reader structured to read magnetic data recorded in a card has been known (see, for example, Japanese Patent Laid-Open No. 2011-40029). A card reader described in the Patent Literature is a so-called dip-type card reader which is mounted and used in a host apparatus such as a refueling device in a gas station. The card reader includes a front frame (bezel) in which a card insertion port is formed and a main body frame fixed to the bezel. The bezel is provided with a front face part structuring a front face of the card reader and a tube part in a substantially tube shape which is formed so as to be connected with the front face part and extended from the front face part toward a rear side.

Further, in the card reader described in the above-mentioned Patent Literature, the main body frame is provided with a head arrangement part in which a magnetic head is disposed, a box-shaped card accommodation part in which a rear end side portion of a card inserted into an insertion port is accommodated, a partition part and a seal arrangement part which are disposed between the head arrangement part and the card accommodation part, and a card guide part for guiding a card inserted into the insertion port. The head arrangement part and the card guide part are formed so as to protrude from the seal arrangement part to a front side. A cut-out part is formed between the head arrangement part and the card guide part in a width direction of the card inserted into the card insertion port. The head arrangement part and the card guide part are disposed on an inner peripheral side of a tube part of the bezel. Further, the head arrangement part and the card guide part are formed with side face parts for guiding a card in a width direction of the card.

In a host apparatus on which the card reader described in the above-mentioned Patent Literature is mounted, a dimension of a front end side portion of the card reader in which the bezel is disposed may be restricted in a width direction of a card inserted into the card insertion port. In other words, in a host apparatus on which the card reader described in the above-mentioned Patent Literature is mounted, a size of a front end side portion of the card reader in which the bezel is disposed is required to reduce in a width direction of the card.

SUMMARY

In view of the problem described above, at least an embodiment of the present invention may advantageously provide a card reader comprising a bezel which is formed with a card insertion port, the card reader being structured so that a size of a front end side portion of the card reader on which the bezel is disposed is capable of being reduced in a width direction of the card.

According to at least an embodiment of the present invention, there may be provided a card reader including a main body frame in which a card passage where at least one end of a card is passed is formed, and a bezel which is formed with a card insertion port in communication with the card passage and is attached to a front end side portion of the main body frame so as to cover the front end side portion of the main body frame. In a case that a width direction of the card perpendicular to an inserting direction of the card to the card insertion port and a thickness direction of the card inserted into the card insertion port is referred to as a first direction, and that a portion of the main body frame which is covered by the bezel is referred to as a frame front end part, the bezel comprises width direction cover parts respectively covering both sides in the first direction of the frame front end part, and both ends in the first direction of the frame front end part are opened, and the frame front end part is structured so that side faces in the first direction of the card passage are structured by the width direction cover parts.

In the card reader in at least an embodiment of the present invention, both ends in the first direction of the frame front end part which structures a front end side portion of the main body frame are opened and, in the frame front end part, side faces in the first direction of the card passage are structured by the width direction cover parts of the bezel. Therefore, in comparison with a conventional case that, in the frame front end part, both ends in the first direction of the frame front end part are closed so that the side faces in the first direction of the card passage are structured by the main body frame and, in addition, the both sides in the first direction of the frame front end part which are closed are covered by parts of the bezel, according to at least an embodiment of the present invention, the size of the front end side portion of the card reader where the bezel is disposed can be reduced in the first direction.

In at least an embodiment of the present invention, the frame front end part is structured of a first frame front end part disposed on one side in the thickness direction of the card and a second frame front end part disposed on the other side in the thickness direction of the card, a space in the thickness direction of the card between the first frame front end part and the second frame front end part is a part of the card passage, and the bezel comprises thickness direction cover parts which respectively cover both sides of the frame front end part in the thickness direction of the card and respectively contact with both ends of the frame front end part in the thickness direction of the card. According to this structure, even when the first frame front end part and the second frame front end part are not fixed to each other, the bezel is capable of restraining the first frame front end part and the second frame front end part from being deformed so as to be separated from each other in the thickness direction of the card. Therefore, a structure for fixing the first frame front end part and the second frame front end part to each other is not required and, as a result, the structure of the card reader can be simplified and the size of the card reader can be reduced.

In at least an embodiment of the present invention, the width direction cover part is formed with a protruded part which is protruded toward an inner side in the first direction and is disposed between the first frame front end part and the second frame front end part in the thickness direction of the card and is contacted with the first frame front end part and the second frame front end part. According to this structure, even when the first frame front end part and the second frame front end part are not fixed to each other, the bezel is capable of restraining the first frame front end part and the second frame front end part from being deformed so as to come close to each other in the thickness direction of the card.

In at least an embodiment of the present invention, in a case that one side in the first direction is referred to as a second direction side and the other side in the first direction is referred to as a third direction side, for example, the frame front end part is structured of a third frame front end part disposed on the second direction side and a fourth frame front end part disposed on the third direction side, a cut-out part which is cut out from a front end of the card reader toward a rear side is provided between the third frame front end part and the fourth frame front end part in the first direction, and the bezel comprises, as the width direction cover parts, a first width direction cover part which covers an opening part at an end on the second direction side of the third frame front end part and a second width direction cover part which covers an opening part at an end on the third direction side of the fourth frame front end part.

In at least an embodiment of the present invention, the bezel includes first thickness direction cover parts which respectively cover both sides of the third frame front end part in the thickness direction of the card and respectively contact with both ends of the third frame front end part in the thickness direction of the card, and second thickness direction cover parts which respectively cover both sides of the fourth frame front end part in the thickness direction of the card and respectively contact with both ends of the fourth frame front end part in the thickness direction of the card, the third frame front end part is structured of a fifth frame front end part disposed on one side in the thickness direction of the card and a sixth frame front end part disposed on the other side in the thickness direction of the card, the fourth frame front end part is structured of a seventh frame front end part disposed on one side in the thickness direction of the card and an eighth frame front end part disposed on the other side in the thickness direction of the card, a space in the thickness direction of the card between the fifth frame front end part and the sixth frame front end part is a part of the card passage, a space in the thickness direction of the card between the seventh frame front end part and the eighth flame front end part is a part of the card passage, the first width direction cover part is formed with a first protruded part which is protruded toward the third direction side and is disposed between the fifth frame front end part and the sixth frame front end part in the thickness direction of the card and is contacted with the fifth frame front end part and the sixth frame front end part, and the second width direction cover part is formed with a second protruded part which is protruded toward the second direction side and is disposed between the seventh frame front end part and the eighth frame front end part in the thickness direction of the card and is contacted with the seventh frame front end part and the eighth frame front end part.

According to this structure, even when the fifth frame front end part and the sixth frame front end part are not fixed to each other, the bezel is capable of restraining the fifth frame front end part and the sixth frame front end part from being deformed so as to be separated from each other or come close to each other in the thickness direction of the card. Further, according to this structure, even when the seventh frame front end part and the eighth frame front end part are not fixed to each other, the bezel is capable of restraining the seventh frame front end part and the eighth frame front end part from being deformed so as to be separated from each other or come close to each other in the thickness direction of the card. Therefore, a structure for fixing the fifth frame front end part and the sixth frame front end part to each other and a structure for fixing the seventh frame front end part and the eighth frame front end part to each other are not required and, as a result, the structure of the card reader can be simplified and the size of the card reader can be reduced.

In at least an embodiment of the present invention, a width of the third frame front end part in the first direction is narrower than a width of the fourth frame front end part in the first direction, a protruding amount to the third direction side of the first protruded part is larger than a protruding amount to the second direction side of the second protruded part, the first protruded part is structured of two third protruded parts which are disposed with a space therebetween in the thickness direction of the card, and the space between the two third protruded parts is a part of the card passage. According to this structure, even when the width in the first direction of the third frame front end part is narrow and thus, the strengths of the fifth frame front end part and the sixth frame front end part are low, it is effectively restrained that the fifth frame front end part and the sixth frame front end part are deformed so as to come close to each other by the first protruded part which is protruded so as to structure a part of the card passage.

In at least an embodiment of the present invention, a width in the first direction of the frame front end part becomes narrow as going to a front side of the card reader, and the width in the first direction of a front end of the frame front end part is equal to a width of the card inserted into the card insertion port. According to this structure, the size of the front end side portion of the card reader on which the bezel is disposed can be further reduced in the first direction.

In at least an embodiment of the present invention, the main body frame is structured of a first frame and a second frame which are divided in the thickness direction of the card, and the first frame and the second frame are fixed to each other by snap-fitting. According to this structure, in comparison with a case that the first frame and the second frame are fixed to each other with a screw, the size of the card reader can be reduced.

In at least an embodiment of the present invention, the bezel is fixed to the main body frame by snap-fitting. According to this structure, in comparison with a case that the bezel is fixed to the main body frame with a screw, the size of the card reader can be reduced.

In at least an embodiment of the present invention, the card reader includes a circuit board which is fixed to a side face of the main body frame in the thickness direction of the card, and the circuit board is fixed to the main body frame by snap-fitting. According to this structure, in comparison with a case that the circuit board is fixed to the main body frame with a screw, the size of the card reader can be reduced in a thickness direction of card.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a plan view showing a front end side of a main body frame shown in FIG. 3.

FIG. 6A is a schematic cross-sectional view for explaining a structure of the "E-E" cross section in FIG. 1 and FIG. GB is a schematic cross-sectional view for explaining a structure of the "F-F" cross section in FIG. 1.

DETAILED DESCRIPTION

An embodiment of the present invention will be described below with reference to the accompanying drawings.

(Entire Structure of Card Reader)

Figure 1:
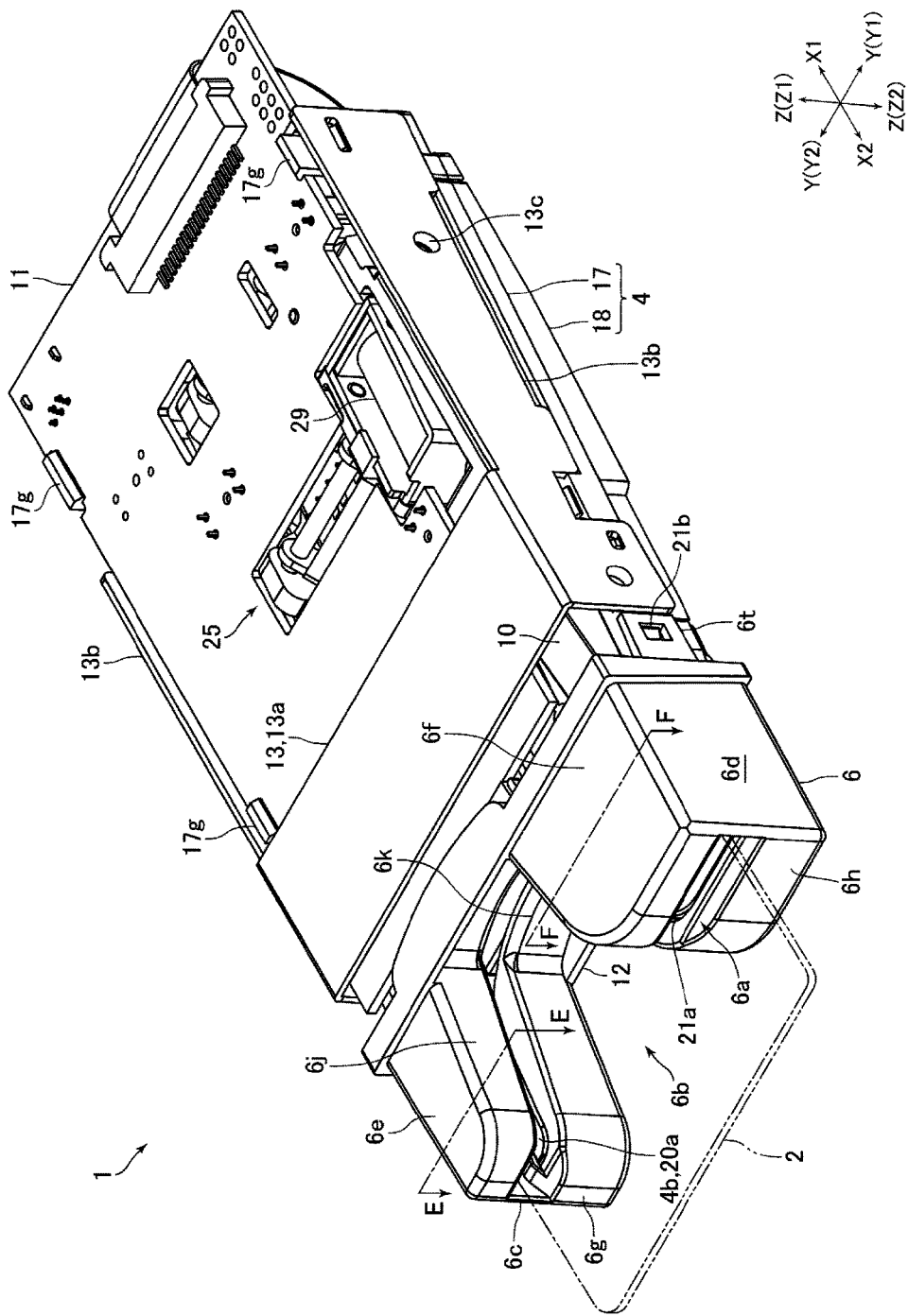
FIG. 1 is a perspective view showing a card reader in accordance with an embodiment of the present invention.
Figure 2:
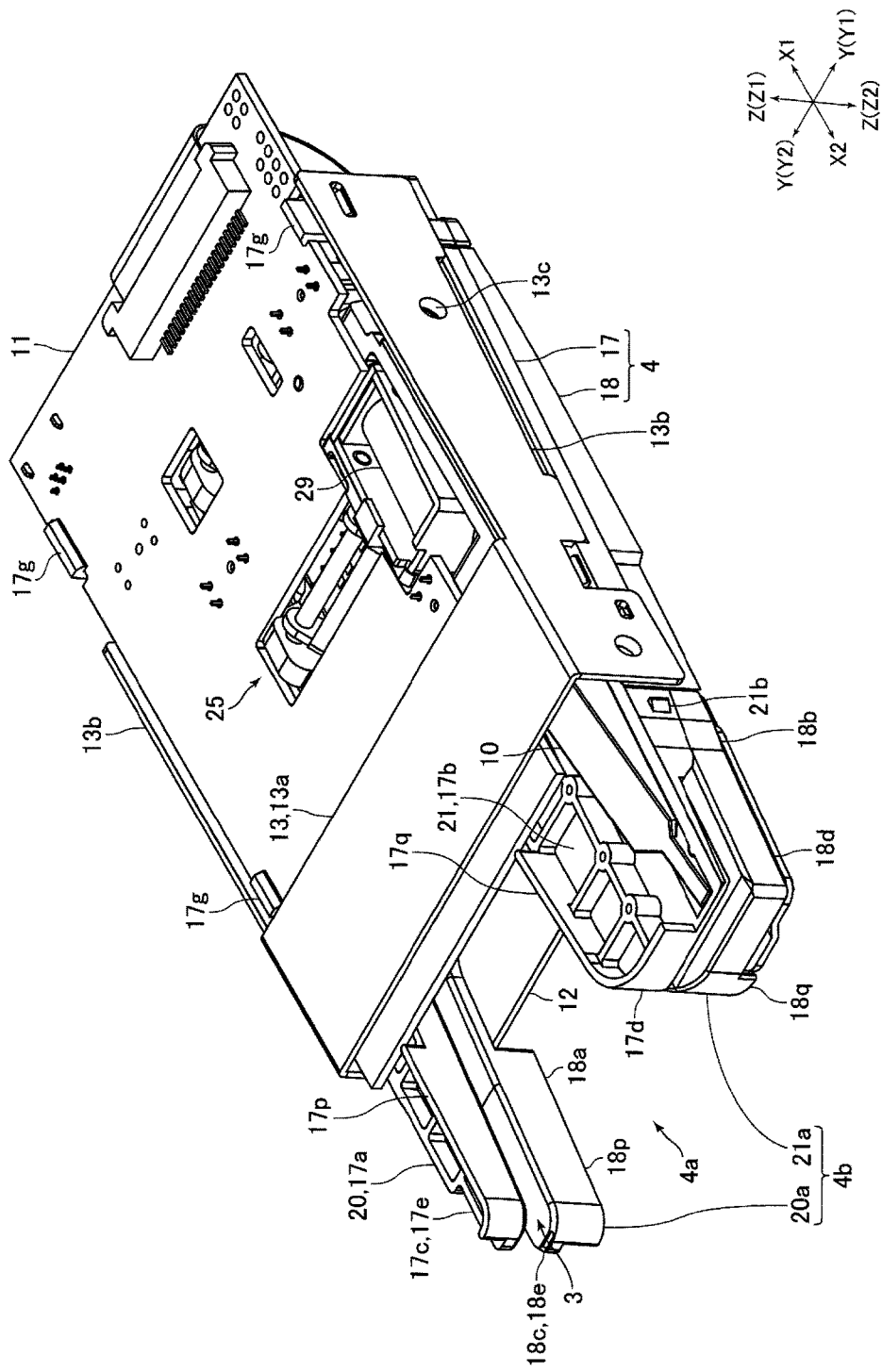
FIG. 2 is a perspective view showing a state that a bezel is detached from the card reader shown in FIG. 1.
Figure 3:
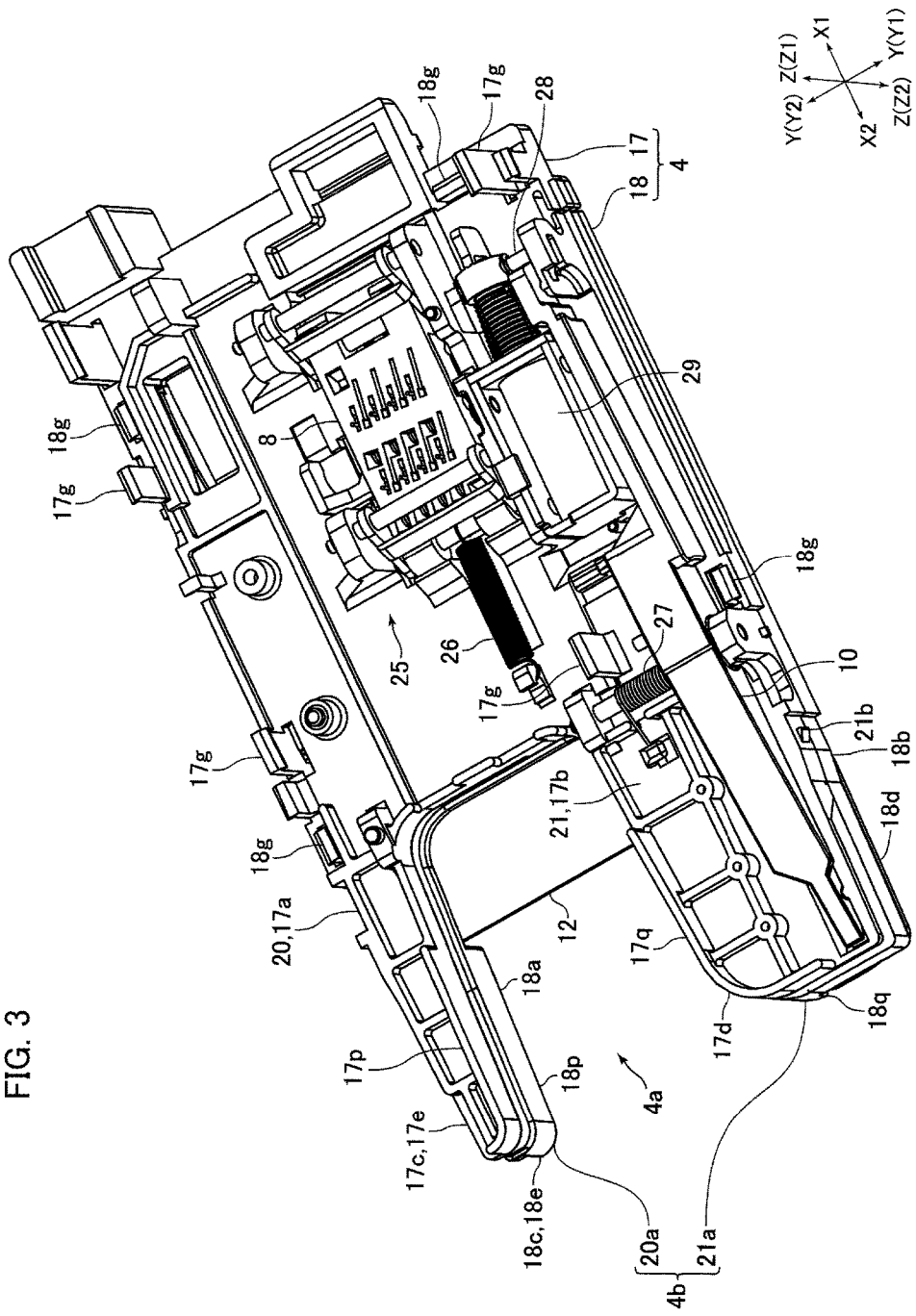
FIG. 3 is a perspective view showing a state that a bezel, a fixed frame and a circuit board are detached from the card reader shown in FIG. 1.
Figure 4:
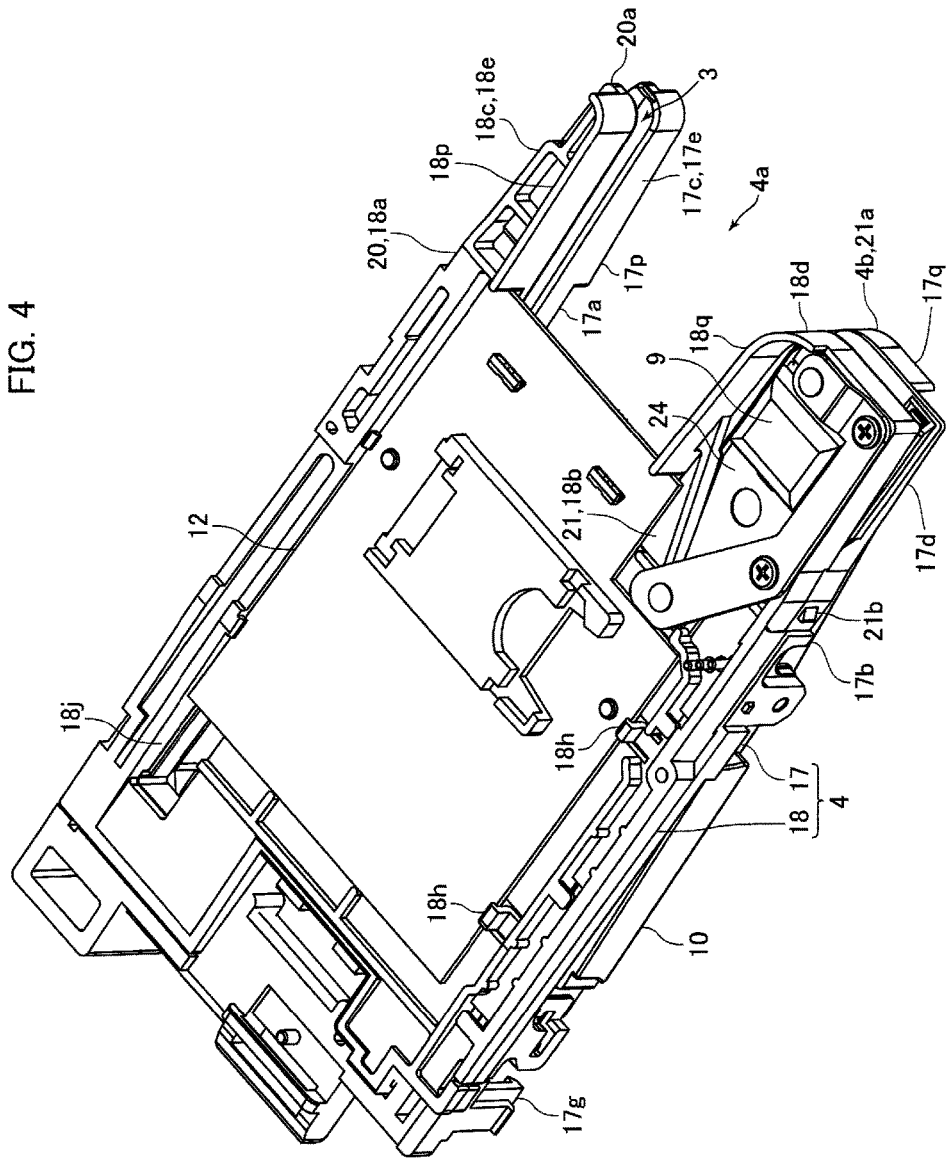
FIG. 4 is a perspective view showing a main body frame, a circuit board and the like shown in FIG. 3 which are viewed from an opposite side.
Figure 4:
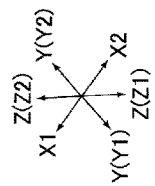

FIG. 1 is a perspective view showing a card reader 1 in accordance with an embodiment of the present invention. FIG. 2 is a perspective view showing a state that a bezel 6 is detached from the card reader 1 shown in FIG. 1. FIG. 3 is a perspective view showing a state that a bezel 6, a fixed frame 13 and a circuit board 11 are detached from the card reader 1 shown in FIG. 1. FIG. 4 is a perspective view showing a main body frame 4, a circuit board 12 and the like shown in FIG. 3 which are viewed from an opposite side. FIG. 5 is a plan view showing a front end side of the main body frame 4 shown in FIG. 3.

A card reader 1 in this embodiment is a device which is structured so that a card 2 is manually operated by a user to perform at least one of reading of data recorded in the card 2 and recording of data to the card 2. The card reader 1 is a so-called dip-type card reader. The card reader 1 is mounted and used in a predetermined host apparatus (not shown). The card reader 1 is formed in a flat and substantially rectangular parallelepiped shape. A card passage 3 where one end of a card 2 is passed is formed in an inside of the card reader 1. The card reader 1 includes a main body frame 4 which is formed with the card passage 3 in its inside, and a bezel (front frame) 6 which is formed with a card insertion port 6a (see FIG. 1) in communication with the card passage 3 and is attached to the main body frame 4.

The card reader 1 includes an IC contact block 8 (see FIG. 3) having a plurality of IC contact springs and a magnetic head 9 (see FIG. 4). Further, the card reader 1 includes a lever member 10 structured to prevent pulling-out of a card 2 having been inserted into its inside, two circuit boards 11 and 12 on which various electronic components and the like are mounted, and a fixed frame 13 for fixing the card reader 1 to a host apparatus on which the card reader 1 is mounted.

In this embodiment, a card 2 is inserted into the card insertion port 6a in the "X1" direction shown in FIG. 1 and the like and the card 2 is pulled out in the "X2" direction shown in FIG. 1 and the like. In other words, the "X1" direction is an inserting direction of a card 2 to the card insertion port 6a, and the "X2" direction is a pulling-out direction of the card 2 from the card insertion port 6a. Further, the "Z" direction in FIG. 1 and the like perpendicular to the "X1" direction is a thickness direction of the card 2 inserted into the card insertion port 6a, and the "Y" direction in FIG. 1 and the like perpendicular to the "X" direction and the "Z" direction is a width direction of the card 2 inserted into the card insertion port 6a.

In the following descriptions, the "X1" direction side is referred to as a "rear" (back) side and the "X2" direction side is referred to as a "front" side. Further, the "Y1" direction side in the "Y" direction is referred to as a "right" side, the "Y2" direction side which is the opposite side is referred to as a "left" side, the "Z1" direction side in the "Z" direction is referred to as an "upper" side, and the "Z2" direction side which is the opposite side is referred to as a "lower" side. The "Y" direction in this embodiment is a first direction, the "Y2" direction side is a second direction side which is one side in the first direction, and the "Y1" direction side is a third direction side which is the other side in the first direction.

A card 2 is a substantially rectangular-shaped card made of vinyl chloride whose thickness is about 0.7-0.8 mm. A magnetic stripe in which magnetic data are recorded is formed on a rear face of the card 2. Further, an IC chip is incorporated in the card 2 and external connection terminals of the IC chip are formed on a front face of the card 2. The card 2 is inserted into the card insertion port 6a in a state that a front face of the card 2 faces an upper side and a longitudinal direction of the card 2 is coincided with the front and rear direction.

A main body frame 4 is, as a whole, formed in a flat and substantially rectangular parallelepiped shape whose thickness in the upper and lower direction is thin. The main body frame 4 is structured of a first frame 17 and a second frame 18 which are divided in the upper and lower direction, and the card passage 3 is formed between the first frame 17 and the second frame 18. In this embodiment, the first frame 17 is disposed on an upper side and the second frame 18 is disposed on a lower side.

A portion on a front end side of the main body frame 4 is formed to be a cut-out part 4a which is cut out from a front end of the card reader 1 toward a rear side. The cut-out part 4a is formed on a front end side of the main body frame 4 at a middle position in the right and left direction. A left side protruded part 20 and a right side protruded part 21 are formed on both sides of the cut-out part 4a in the right and left direction. The left side protruded part 20 is structured of a protruded part 17a protruded from a left end side of the first frame 17 to a front side and a protruded part 18a which is protruded from a left end side of the second frame 18 to the front side. The right side protruded part 21 is structured of a protruded part 17b protruded from a right end side of the first frame 17 to a front side and a protruded part 18b which is protruded from a right end side of the second frame 18 to the front side.

In this embodiment, a front end side portion of the left side protruded part 20 and a front end side portion of the right side protruded part 21 are covered by a bezel 6. In other words, when a portion of the main body frame 4 which is covered by the bezel 6 is referred to as a frame front end part 4b, a front end side portion of the left side protruded part 20 is referred to as a third frame front end part 20a, and a front end side portion of the right side protruded part 21 is referred to as a fourth frame front end part 21a, the frame front end part 4b is structured of the third frame front end part 20a disposed on a left side and the fourth frame front end part 21a disposed on a right side. As described above, the cut-out part 4a is formed between the third frame front end part 20a and the fourth frame front end part 21a in the right and left direction.

The third frame front end part 20a is structured of a front end side portion of the protruded part 17a of the first frame 17 which is disposed on an upper side and a front end side portion of the protruded part 18a of the second frame 18 which is disposed on a lower side. When a front end side portion of the protruded part 17a structuring the third frame front end part 20a is referred to as a fifth frame front end part 17c and a front end side portion of the protruded part 18a structuring the third frame front end part 20a is referred to as a sixth frame front end part 18c, a space in the upper and lower direction between the fifth frame front end part 17c and the sixth frame front end part 18c is formed to be a part of the card passage 3.

The fourth frame front end part 21a is structured of a front end side portion of the protruded part 17b of the first frame 17 which is disposed on an upper side and a front end side portion of the protruded part 18b of the second frame 18 which is disposed on a lower side. When a front end side portion of the protruded part 17b structuring the fourth frame front end part 21a is referred to as a seventh frame front end part 17d and a front end side portion of the protruded part 18b structuring the fourth frame front end part 21a is referred to as an eighth frame front end part 18d, a space in the upper and lower direction between the fifth frame front end part 17c and the sixth frame front end part 18c is formed to be a part of the card passage 3.

In this embodiment, a first frame front end part 17e disposed on an upper side is structured of the fifth frame front end part 17c and the seventh frame front end part 17d, and a second frame front end part 18e disposed on a lower side is structured of the sixth frame front end part 18c and the eighth frame front end part 18d. In other words, the frame front end part 4b is structured of the first frame front end part 17e disposed on the upper side and the second frame front end part 18e disposed on the lower side, and a space in the upper and lower direction between the first frame front end part 17e and the second frame front end part 18e is formed to be a part of the card passage 3.

In the upper and lower direction, a space is formed between a left end of the fifth frame front end part 17c and a left end of the sixth frame front end part 18c and thus a left end of the third frame front end part 20a is opened. The space is continuously formed toward a rear side from the front end of the fifth frame front end part 17c and from the front end of the sixth frame front end part 18c. Similarly, in the upper and lower direction, a space is formed between a right end of the seventh frame front end part 17d and a right end of the eighth frame front end part 18d and thus a right end of the fourth frame front end part 21a is opened. The space is also continuously formed toward a rear side from the front end of the seventh frame front end part 17d and from the front end of the eighth frame front end part 18d. In other words, both ends in the right and left direction of the frame front end part 4b are opened.

A front end and a right end of the left side protruded part 20 are opened so that a card 2 is capable of being inserted into the card reader 1. Similarly, a front end and a left end of the right side protruded part 21 are opened so that a card 2 is capable of being inserted into the card reader 1. Further, in a portion on a rear side with respect to the frame front end part 4b, a left end side portion of the first frame 17 and a left end side portion of the second frame 18 are abutted with each other in the upper and lower direction, and a right end side portion of the first frame 17 and a right end side portion of the second frame 18 are abutted with each other in the upper and lower direction. In other words, in a portion on the rear side with respect to the frame front end part 4b, both ends in the right and left direction of the main body frame 4 are closed. Therefore, in the portion on the rear side with respect to the frame front end part 4b, side faces in the right and left direction of the card passage 3 are formed by the main body frame 4. Accordingly, in the frame front end part 4b, the fifth frame front end part 17c and the sixth frame front end part 18c are structured so as to protrude from the main body frame 4 in a cantilevered manner, and the seventh frame front end part 17d and the eighth frame front end part 18d are structured so as to protrude from the main body frame 4 in a cantilevered manner. In other words, the fifth frame front end part 17c and the sixth frame front end part 18c are respectively protruded to a front side independently without abutting with each other, and the seventh frame front end part 17d and the eighth frame front end part 18d are respectively protruded to a front side independently without abutting with each other.

A width in the right and left direction of the left side protruded part 20 is narrower than a width in the right and left direction of the right side protruded part 21. In other words, a width in the right and left direction of the third frame front end part 20a is set to be narrower than a width in the right and left direction of the fourth frame front end part 21a. Further, as shown in FIG. 5, a width in the right and left direction of the frame front end part 4b is gradually narrowed as going to a front side. Further, a width "H" (see FIG. 5) of a front end of the frame front end part 4b is equal to a width of a card 2 inserted into the card insertion port 6a (a width in a short-side direction of a card 2 having a substantially rectangular shape).

An upper face of the second frame 18 is formed with a plurality of engaging pawls 18g which are extended toward an upper side. Specifically, as shown in FIG. 3, an engaging pawl 18g which is capable of being elastically deformed in the right and left direction is formed at two positions of a left end side portion of an upper face of the second frame 18 and one position of a right end side portion of the upper face of the second frame 18. In addition, an engaging pawl 18g which is capable of being elastically deformed in the front and rear direction is formed at one position of a rear end portion of the upper face of the second frame 18. Four engaging pawls 18g are disposed on a rear side with respect to the left side protruded part 20 and the right side protruded part 21. In other words, the four engaging pawls 18g are disposed on a rear side with respect to the frame front end part 4b. The first frame 17 is formed with engaging holes through which the engaging pawls 18g are inserted and engaged. The first frame 17 and the second frame 18 are fixed to each other by snap-fitting which is a fixing method utilizing elasticity of the engaging pawl 18g.

An under face of the second frame 18 is formed with a plurality of engaging pawls 18h extending toward a lower side. Specifically, as shown in FIG. 4, the engaging pawl 18h which is capable of being elastically deformed in the right and left direction is formed at two positions of a right end side portion of the under face of the second frame 18. Further, an upper face of the first frame 17 is formed with a plurality of engaging pawls 17g extending toward an upper side. Specifically, as shown in FIG. 3, the engaging pawl 17g capable of being elastically deformed in the right and left direction is formed at two positions of a left end side portion of the upper face of the first frame 17 and two positions of a right end side portion of the upper face of the first frame 17. Further, as shown in FIG. 5, a protruded part 20b protruding toward a left side is formed on a left side face of the left side protruded part 20, and a protruded part 21b protruding toward a right side is formed on a right side face of the right side protruded part 21. The protruded parts 20b and 2 lb are disposed on a rear side with respect to the frame front end part 4b.

A magnetic head 9 is attached to the fourth frame front end part 21a. The magnetic head 9 is disposed so that a magnetic gap of the magnetic head 9 faces the card passage 3 from a lower side. Further, the magnetic head 9 is fixed to a plate spring 24 (see FIG. 4) and is urged to an upper side by an urging force of the plate spring 24.

An IC contact block 8 is disposed in a rear end side portion of the card reader 1. The IC contact block 8 is disposed to an upper side of the card passage 3 so that IC contact springs face the card passage 3 from an upper side. Further, the IC contact block 8 is connected with the first frame 17 through a parallel link mechanism 25 and is moved up and down while sliding in the front and rear direction. Further, the IC contact block 8 is urged to a front side by a tension coil spring 26 (see FIG. 3).

In this embodiment, when a tip end (rear end) of a card 2 inserted to a rear side of the card reader 1 is engaged with a card engaging part formed at a rear end of the IC contact block 8, the IC contact block 8 is moved downward while sliding to the rear side and a plurality of IC contact springs is contacted with external connection terminals of the card 2. Further, when the card 2 inserted to the rear side is pulled out to a front side, the IC contact block 8 is moved upward while sliding to the front side by the urging force of the tension coil spring 26 so that the IC contact springs are separated from a front face of the card 2.

A lever member 10 is turnable between a closing position where the card passage 3 is closed and an open position where the card passage 3 is opened. Further, a front end of the lever member 10 is disposed in the fourth frame front end part 21a and the lever member 10 prevents pulling-out of the inserted card 2 at the closing position. Further, the card reader 1 includes, as shown in FIG. 3, a torsion coil spring 27 which urges the lever member 10 to the closing position, a restriction pin 28 which restricts turning of the lever member 10 at the closing position, and a solenoid 29 structured to move the restriction pin 28 between a turning restricted position where turning of the lever member 10 is restricted and a turnable position where turning of the lever member 10 is permitted.

In this embodiment, when a card 2 is not inserted into the card insertion port 6a, the lever member 10 closes the card passage 3. In this state, when a card 2 is inserted, an end face of the card 2 is contacted with an inclined face of a front end side portion of the lever member 10 which closes the card passage 3 and the lever member 10 is turned against an urging force of the torsion coil spring 27 to open the card passage 3. After that, when the card 2 is further inserted to the rear side, the lever member 10 is turned by the urging force of the torsion coil spring 27 and the front end side of the card passage 3 is closed.

The circuit boards 11 and 12 are rigid circuit boards and are formed in a substantially rectangular flat plate shape. The circuit board 11 is fixed to an upper face of the main body frame 4 by snap-fitting. Specifically, the circuit board 11 is fixed to the upper face of the main body frame 4 by snap-fitting utilizing elasticity of the engaging pawl 17g of the first frame 17 which is engaged with the engaging hole formed in the circuit board 11 or engaged with an end face of the circuit board 11.

The circuit board 12 is fixed to an under face of the main body frame 4 by snap-fitting. Specifically, the circuit board 12 is fixed to an under face of the main body frame 4 by snap-fitting utilizing elasticity of the engaging pawl 18h of the second frame 18 which is engaged with a right end face of the circuit board 12. In this embodiment, a left end face of the circuit board 12 is abutted with an abutting face 18j which is formed on an under face side of the second frame 18 (see FIG. 4).

A fixed frame 13 is formed by bending a metal thin plate in a predetermined shape and is fixed to the main body frame 4. The fixed frame 13 is structured of an upper face part 13a which covers an upper face of a front side portion of the circuit board 11 and two side face parts 13b which cover right and left side faces of the main body frame 4. The side face part 13b is formed with a screw hole 13c for fixing the card reader 1 to a host apparatus.

(Structure of Bezel)

FIG. 6A is a schematic cross-sectional view for explaining a structure of the "E-E" cross section in FIG. 1 and FIG. 6B is a schematic cross-sectional view for explaining a structure of the "F-F" cross section in FIG. 1.

A bezel 6 is attached to a front end side portion of the main body frame 4 so as to cover a front end side portion (specifically, frame front end part 4b) of the main body frame 4. The bezel 6 is formed with a cut-out part 6b corresponding to a shape of the cut-out part 4a of the main body frame 4 and the shape of the bezel 6 when viewed in the upper and lower direction is a substantially "U"-shape. The cut-out part 6b is formed so that insertion of a card 2 and pulling-out of the card 2 by a user can be performed. Therefore, in a state that a tip end (rear end) of a card 2 inserted into the card insertion port 6a has been reached to the rear end side of the card passage 3, a front end of the card 2 is disposed in the cut-out part 6b. Further, a rear face of the bezel 6 is opened and the bezel 6 is attached to the front end side portion of the main body frame 4 from a front side.

The bezel 6 is provided with a width direction cover part 6c as a first width direction cover part, which covers an opening part on a left side of the frame front end part 4b (in other words, which covers an opening part on the left end side of the third frame front end part 20a), and a width direction cover part 6d as a second width direction cover part which covers an opening part on a right side of the frame front end part 4b (in other words, which covers an opening part on the right end side of the fourth frame front end part 21a). In other words, the bezel 6 is provided with the width direction cover parts 6c and 6d which respectively cover both sides in the right and left direction of the frame front end part 4b.

Further, the bezel 6 is provided with two thickness direction cover parts 6e as a first thickness direction cover part, which respectively cover both sides in the upper and lower direction of the third frame front end part 20a, and two thickness direction cover parts 6f as a second thickness direction cover part which respectively cover both sides in the upper and lower direction of the fourth frame front end part 21a. In other words, the bezel 6 is provided with the thickness direction cover parts 6e and 6f which respectively cover both sides in the upper and lower direction of the frame front end part 4b. In addition, the bezel 6 is provided with a front side cover part 6g which covers a front side of the third frame front end part 20a, a front side cover part 6h which covers a front side of the fourth frame front end part 21a, an inner side cover part 6j which covers a right side of the third frame front end part 20a, an inner side cover part which covers a left side of the fourth frame front end part 21a, and a rear side cover part 6k which covers a rear side portion of the cut-out part 4a (in other words, which covers a portion of the main body frame 4 between a rear end of the left side protruded part 20 and a rear end of the right side protruded part 21).

The width direction cover part 6c is connected with two thickness direction cover parts 6e, the front side cover part 6g is connected with the width direction cover part 6c and two thickness direction cover parts 6e, and the inner side cover part 6j is connected with two thickness direction cover parts 6e and the front side cover part 6g. The width direction cover part 6d is connected with two thickness direction cover parts 6f, the front side cover part 6h is connected with the width direction cover part 6d and two thickness direction cover parts 6f, and the inner side cover part which covers a left side of the fourth frame front end part 21a is connected with two thickness direction cover parts 6f and the front side cover part 6h. The rear side cover part 6k is connected with the inner side cover part 6j and an inner side cover part which covers a left side of the fourth frame front end part 21a. The card insertion port 6a is formed in the front side cover parts 6g and 6h, the inner side cover part 6j, the inner side cover part which covers the left side of the fourth frame front end part 21a, and the rear side cover part 6k. The card insertion port 6a is formed in a slit shape.

The width direction cover part 6c is contacted with a left side face of the third frame front end part 20a and structures a left side face of the card passage 3 in the third frame front end part 20a (see FIG. 6A). In other words, the width direction cover part 6c is used as a guide face which is abutted with a left end face of an inserted card 2 for guiding the card 2 which is to be passed along the card passage 3. Further, the width direction cover part 6d is contacted with a right side face of the fourth frame front end part 21a and structures a right side face of the card passage 3 in the fourth frame front end part 21a (see FIG. 6B). In other words, the width direction cover part 6d is used as a guide face which is abutted with a right end face of the inserted card 2 for guiding the card 2 which is to be passed along the card passage 3. In other words, in the frame front end part 4b, side faces in the right and left direction of the card passage 3 (guide faces by which end faces in the right and left direction of a card are guided) are structured by using the width direction cover parts 6c and 6d.

As shown in FIG. 6A, the width direction cover part 6c is formed with a protruded part 6p as a first protruded part which protrudes to the right side. The protruded part 6p is disposed between the fifth frame front end part 17c and the sixth frame front end part 18c in the upper and lower direction, and the protruded part 6p is contacted with an under face of the fifth frame front end part 17c and an upper face of the sixth frame front end part 18c. Therefore, the protruded part 6p determines a distance in the upper and lower direction between the under face of the fifth frame front end part 17c and the upper face of the sixth frame front end part 18c, in other words, the protruded part 6p determines a width in the upper and lower direction of the card passage 3. Further, as shown in FIG. 6B, the width direction cover part 6d is formed with a protruded part 6q as a second protruded part which protrudes to the left side. The protruded part 6q is disposed between the seventh frame front end part 17d and the eighth frame front end part 18d in the upper and lower direction, and the protruded part 6q is contacted with an under face of the seventh frame front end part 17d and an upper face of the eighth frame front end part 18d. Therefore, the protruded part 6q determines a distance in the upper and lower direction between the under face of the seventh frame front end part 17d and the upper face of the eighth frame front end part 18d, in other words, the protruded part 6q determines a width in the upper and lower direction of the card passage 3.

In other words, the width direction cover parts 6c and 6d are formed with protruded parts 6p and 6q which are protruded toward an inner side in the right and left direction, and are disposed between the first frame front end part 17e and the second frame front end part 18e in the upper and lower direction. The protruded parts 6p and 6q are contacted with the first frame front end part 17e and the second frame front end part 18e.

A protruding amount to the right side of the protruded part 6p is set to be larger than a protruding amount to the left side of the protruded part 6q. Further, the protruded part 6p in this embodiment is structured of two protruded parts 6r as a third protruded part which are disposed with a space therebetween in the upper and lower direction. The protruded part 6r disposed on an upper side is contacted with the under face of the fifth frame front end part 17c, and the protruded part 6r disposed on a lower side is contacted with the upper face of the sixth frame front end part 18c. A space between the two protruded parts 6r is a part of the card passage 3 and a left end side of an inserted card 2 is passed along the space between the two protruded parts 6r. Therefore, since two protruded parts 6r are provided, while respectively supporting the fifth frame front end part 17 and the sixth frame front end part 18c, a card 2 can be passed along the space between the two protruded parts 6r. Accordingly, the size in the right and left direction of the front end side portion of the card reader 1 can be reduced.

The thickness direction cover part 6e disposed on an upper side of two thickness direction cover parts 6e is contacted with an upper end of the third frame front end part 20a, and the thickness direction cover part 6e disposed on a lower side is contacted with a lower end of the third frame front end part 20a. In this embodiment, a wall part 17p which is extended to an upper side over a region from the front end side of the fifth frame front end part 17c to its right end side is formed in the fifth frame front end part 17c, and the thickness direction cover part 6e disposed on an upper side is contacted with an upper end face of the wall part 17p. Further, a wall part 18p which is extended to a lower side over a region from the front end side of the sixth frame front end part 18c to its right end side is formed in the sixth frame front end part 18c, and the thickness direction cover part 6e disposed on a lower side is contacted with a lower end face of the wall part 18p.

Similarly, the thickness direction cover part 6f disposed on an upper side of two thickness direction cover parts 6f is contacted with an upper end of the fourth frame front end part 21a, and the thickness direction cover part 6f disposed on a lower side is contacted with a lower end of the fourth frame front end part 21a. In this embodiment, a wall part 17q which is extended to an upper side over a region from the front end side of the seventh frame front end part 17d to its left end side is formed in the seventh frame front end part 17d, and the thickness direction cover part 6f disposed on an upper side is contacted with an upper end face of the wall part 17q. Further, a wall part 18q which is extended to a lower side over a region from the front end side of the eighth frame front end part 18d to its left end side is formed in the eighth frame front end part 18d, and the thickness direction cover part 6f disposed on a lower side is contacted with a lower end face of the wall part 18q.

In other words, the thickness direction cover parts 6e and 6f are respectively contacted with both ends in the upper and lower direction of the third frame front end part 20a and the fourth frame front end part 21a (in other words, the thickness direction cover parts 6e and 6f are respectively contacted with both ends in the upper and lower direction of the frame front end part 4b).

Both right and left ends of the bezel 6 are respectively formed with an engaging pawl 6t which is extended toward a rear side (see FIG. 1). The engaging pawl 6t is capable of being elastically deformed in the right and left direction.

Further, the engaging pawls 6*t* are formed with engaging holes engaging with the protruded parts 20*b* and 21*b* of the main body frame 4. The bezel 6 is fixed to the main body frame 4 by snap-fitting utilizing elasticity of the engaging pawls 6*t* which are engaged with the protruded parts 20*b* and 21*b*.

(Principal Effects in this Embodiment)

As described above, in this embodiment, both ends in the right and left direction of the frame front end part 4*b* are opened. Further, in this embodiment, the width direction cover part 6*c* of the bezel 6 is contacted with the left side face of the third frame front end part 20*a* and the width direction cover part 6*d* of the bezel 6 is contacted with the right side face of the fourth frame front end part 21*a* and thus, in the frame front end part 4*b*, the side faces in the right and left direction of the card passage 3 are structured by using the width direction cover parts 6*c* and 6*d*. Therefore, in comparison with a case that, in the frame front end part 4*b*, both ends in the right and left direction of the frame front end part 4*b* are closed so that the side faces in the right and left direction of the card passage 3 is structured by using the main body frame 4 and, in addition, the both sides in the right and left direction of the frame front end part 4*b* which are closed are covered by parts of the bezel 6, according to this embodiment, the size of the front end side portion of the card reader 1 where the bezel 6 is disposed can be reduced in the right and left direction.

In this embodiment, each of the two thickness direction cover parts 6*e* of the bezel 6 is contacted with each of both ends in the upper and lower direction of the third frame front end part 20*a*. Further, in this embodiment, the protruded part 6*p* which is formed in the width direction cover part 6*c* is disposed between the fifth frame front end part 17*c* and the sixth frame front end part 18*c* in the upper and lower direction, and the protruded part 6*p* is contacted with the under face of the fifth frame front end part 17*c* and the upper face of the sixth frame front end part 18*c*. Therefore, according to this embodiment, even when the fifth frame front end part 17*c* and the sixth frame front end part 18*c* are not fixed to each other, in other words, even when the fifth frame front end part 17*c* and the sixth frame front end part 18*c* are respectively structured so as to be independently protruded to a front side, the fifth frame front end part 17*c* and the sixth frame front end part 18*c* can be restrained by the bezel 6 from being deformed so as to be separated from each other in the upper and lower direction or being deformed so as to come close to each other. Accordingly, in this embodiment, a structure for fixing the fifth frame front end part 17*c* and the sixth frame front end part 18*c* to each other is not required and, as a result, the structure of the card reader 1 can be simplified and the size of the card reader 1 can be reduced.

Similarly, in this embodiment, each of the two thickness direction cover parts 6*f* of the bezel 6 is contacted with each of both ends in the upper and lower direction of the fourth frame front end part 21*a*. Further, the protruded part 6*q* which is formed in the width direction cover part 6*d* is disposed between the seventh frame front end part 17*d* and the eighth frame front end part 18*d* in the upper and lower direction, and the protruded part 6*q* is contacted with the under face of the seventh frame front end part 17*d* and the upper face of the eighth frame front end part 18*d*. Therefore, according to this embodiment, even when the seventh frame front end part 17*d* and the eighth frame front end part 18*d* are not fixed to each other, in other words, even when the seventh frame front end part 17*d* and the eighth frame front end part 18*d* are respectively structured so as to be independently protruded to a front side, the seventh frame front end part 17*d* and the eighth frame front end part 18*d* can be restrained by the bezel 6 from being deformed so as to be separated from each other in the upper and lower direction or being deformed so as to come close to each other. Accordingly, in this embodiment, a structure for fixing the seventh frame front end part 17*d* and the eighth frame front end part 18*d* to each other is not required and, as a result, the structure of the card reader 1 can be simplified and the size of the card reader 1 can be reduced.

In this embodiment, a width in the right and left direction of the third frame front end part 20*a* is narrower than a width in the right and left direction of the fourth frame front end part 21*a* and thus, the strengths of the fifth frame front end part 17*c* and the sixth frame front end part 18*c* are comparatively low. However, the protruded parts 6*r* are protruded (in other words, the protruded part 6*p* is protruded) so as to structure a part of the card passage 3, the fifth frame front end part 17*c* and the sixth frame front end part 18*c* are effectively restrained from being deformed so as to come close to each other by the protruded part 6*p*.

In this embodiment, the width in the right and left direction of the frame front end part 4*b* gradually becomes narrow as going to a front side and the width "H" of the front end of the frame front end part 4*b* is equal to a width of a card 2 inserted into the card insertion port 6*a*. Therefore, in this embodiment, the size of a front end side portion of the card reader 1 where the bezel 6 is disposed can be further reduced in the right and left direction.

In this embodiment, the first frame 17 and the second frame 18 are fixed to each other by snap-fitting. Therefore, according to this embodiment, in comparison with a case that the first frame 17 and the second frame 18 are fixed to each other with a screw, the size of the card reader 1 can be reduced. Further, in this embodiment, the bezel 6 is fixed to the main body frame 4 by snap-fitting and thus, in comparison with a case that the bezel 6 is fixed to the main body frame 4 with a screw, the size of the card reader 1 can be reduced. Further, in this embodiment, the circuit board 11 is fixed to an upper face of the main body frame 4 by snap-fitting and the circuit board 12 is fixed to an under face of the main body frame 4 by snap-fitting. Therefore, in comparison with a case that the circuit boards 11 and 12 are fixed to the main body frame 4 with a screw, the size of the card reader 1 can be reduced in the upper and lower direction.

(Other Embodiments)

Although the present invention has been shown and described with reference to a specific embodiment, various changes and modifications will be apparent to those skilled in the art from the teachings herein.

In the embodiment described above, two thickness direction cover parts 6*e* of the bezel 6 are respectively contacted with both ends in the upper and lower direction of the third frame front end parts 20*a*. However, a gap space may be formed between the thickness direction cover part 6*e* disposed on an upper side and an upper end of the third frame front end part 20*a*. Alternatively, a gap space may be formed between the thickness direction cover part 6*e* disposed on a lower side and a lower end of the third frame front end part 20*a* Similarly, in the embodiment described above, two thickness direction cover parts 6*f* of the bezel 6 are respectively contacted with both ends in the upper and lower direction of the fourth frame front end parts 21*a*. However, a gap space may be formed between the thickness direction cover part 6*f* disposed on an upper side and an upper end of the fourth frame front end part 21*a*. Alternatively, a gap space may be formed between the thickness direction cover part 6*f* disposed on a lower side and a lower end of the fourth frame front end part 21*a*.

In the embodiment described above, the protruded part 6*q* may be, similarly to the protruded part 6*p*, structured of two protruded parts which are disposed so as to have a space therebetween in the upper and lower direction. Further, in the embodiment described above, the protruded part 6*p* may be similarly formed to the protruded part 6*q*. Further, no protruded part 6*p* may be formed in the width direction cover part 6*c* and no protruded part 6*q* may be formed in the width direction cover part 6*d*. Further, in the embodiment described above, the cut-out part 4*a* is formed in the main body frame 4 and the cut-out part 6*b* is formed in the bezel 6. However, no cut-out parts 4*a* and 6*b* may be formed. In addition, in the embodiment described above, the width "H" of a front end of the frame front end part 4*b* is equal to a width of a card 2. However, the width "H" may be set wider than a width of a card 2. Further, in the embodiment described above, a width in the right and left direction of the frame front end part 4*b* becomes gradually narrow as going to a front side. However, a width in the right and left direction of the frame front end part 4*b* may be constant.

In the embodiment described above, the first frame 17 and the second frame 18 are fixed to each other by snap-fitting. However, the first frame 17 and the second frame 18 may be fixed to each other with a screw. Further, in the embodiment described above, the bezel 6 is fixed to the main body frame 4 by snap-fitting. However, the bezel 6 may be fixed to the main body frame 4 with a screw. In addition, in the embodiment described above, the circuit boards 11 and 12 are fixed to the main body frame 4 by snap-fitting. However, the circuit boards 11 and 12 may be fixed to the main body frame 4 with a screw.

In the embodiment described above, a card 2 is a card made of vinyl chloride whose thickness is about 0.7-0.8 mm. However, a card 2 may be a PET (polyethylene terephthalate) card whose thickness is about 0.18-0.36 mm or may be a paper card having a predetermined thickness. Further, in the embodiment described above, the card reader 1 is a manual type card reader. However, a card reader to which at least an embodiment the present invention is applied may be a card conveyance type card reader having a conveying mechanism for a card 2. In this case, for example, a card passage may be formed so that the entire card 2 is passed along the card passage.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader comprising:

a main body frame comprising a card passage where at least one end of a card is passed; and a bezel comprising a card insertion port in communication with the card passage and attached to a front end side portion of the main body frame so as to cover the front end side portion of the main body frame;

wherein in a case that a width direction of the card perpendicular to an inserting direction of the card to the card insertion port and a thickness direction of the card inserted into the card insertion port is referred to as a first direction, and that a portion of the main body frame which is covered by the bezel is referred to as a frame front end part, the bezel comprises width direction cover parts respectively covering both sides in the first direction of the frame front end part;

both ends in the first direction of the frame front end part are opened; and the frame front end part is structured so that side faces in the first direction of the card passage are structured by the width direction cover parts;

wherein in a case that one side in the first direction is referred to as a second direction side and the other side in the first direction is referred to as a third direction side, the frame front end part comprises a third frame front end part disposed on the second direction side and a fourth frame front end part disposed on the third direction side, a cut-out part which is cut out from a front end of the card reader toward a rear side is provided between the third frame front end part and the fourth frame front end part in the first direction, and the bezel comprises, as the width direction cover parts, a first width direction cover part which covers an opening part at an end on the second direction side of the third frame front end part and a second width direction cover part which covers an opening part at an end on the third direction side of the fourth frame front end part;

herein the bezel comprises:

first thickness direction cover parts which respectively cover both sides of the third frame front end part in the thickness direction of the card and respectively contact with both ends of the third frame front end part in the thickness direction of the card; and second thickness direction cover parts which respectively cover both sides of the fourth frame front end part in the thickness direction of the card and respectively contact with both ends of the fourth frame front end part in the thickness direction of the card, the third frame front end part comprises a fifth frame front end part disposed on one side in the thickness direction of the card and a sixth frame front end part disposed on the other side in the thickness direction of the card, the fourth frame front end part comprises a seventh frame front end part disposed on one side in the thickness direction of the card and an eighth frame front end part disposed on the other side in the thickness direction of the card, a space between the fifth frame front end part and the sixth frame front end part in the thickness direction of the card is a part of the card passage, a space between the seventh frame front end part and the eighth flame front end part in the thickness direction of the card is a part of the card passage, the first width direction cover part comprises a first protruded part which is protruded toward the third direction side and is disposed between the fifth frame front end part and the sixth frame front end part in the thickness direction of the card and is contacted with the fifth frame front end part and the sixth frame front end part, and the second width direction cover part comprises a second protruded part which is protruded toward the second direction side and is disposed between the seventh frame front end part and the eighth frame front end part in the thickness direction of the card and is contacted with the seventh frame front end part and the eighth frame front end part.

2. The card reader according to claim 1, wherein
the frame front end part is structured of a first frame front end part disposed on one side in the thickness direction of the card and a second frame front end part disposed on the other side in the thickness direction of the card,
a space between the first frame front end part and the second frame front end part in the thickness direction of the card is a part of the card passage, and
the bezel comprises thickness direction cover parts which respectively cover both sides of the frame front end part in the thickness direction of the card and respectively contact with both ends of the frame front end part in the thickness direction of the card.

3. The card reader according to claim 2, wherein
the width direction cover part comprises a protruded part which is protruded toward an inner side in the first direction and is disposed between the first frame front end part and the second frame front end part in the thickness direction of the card and is contacted with the first frame front end part and the second frame front end part.

4. The card reader according to claim 1, wherein
a width of the third frame front end part in the first direction is narrower than a width of the fourth frame front end part in the first direction,
a protruding amount to the third direction side of the first protruded part is larger than a protruding amount to the second direction side of the second protruded part,
the first protruded part comprises two third protruded parts which are disposed with a space therebetween in the thickness direction of the card, and
the space between the two third protruded parts is a part of the card passage.

5. The card reader according to claim 1, wherein
a width in the first direction of the frame front end part becomes narrow as going to a front side of the card reader, and
the width in the first direction of a front end of the frame front end part is equal to a width of the card to be inserted into the card insertion port.

6. The card reader according to claim 5, wherein
the frame front end part comprises a first frame front end part disposed on one side in the thickness direction of the card and a second frame front end part disposed on the other side in the thickness direction of the card,
a space between the first frame front end part and the second frame front end part in the thickness direction of the card is a part of the card passage, and
the bezel comprises thickness direction cover parts which respectively cover both sides of the frame front end part in the thickness direction of the card and respectively contact with both ends of the frame front end part in the thickness direction of the card.

7. The card reader according to claim 6, wherein
the width direction cover part comprises a protruded part which is protruded toward an inner side in the first direction and is disposed between the first frame front end part and the second frame front end part in the thickness direction of the card and is contacted with the first frame front end part and the second frame front end part.

8. The card reader according to claim 1, wherein
the main body frame comprises a first frame and a second frame which are divided in the thickness direction of the card, and
the first frame and the second frame are fixed to each other by snap-fitting.

9. The card reader according to claim 8, further comprising a circuit board which is fixed to a side face of the main body frame in the thickness direction of the card,
wherein the circuit board is fixed to the main body frame by snap-fitting.

10. The card reader according to claim 1, wherein the bezel is fixed to the main body frame by snap-fitting.

11. The card reader according to claim 10, wherein
the main body frame comprises a first frame and a second frame which are divided in the thickness direction of the card, and
the first frame and the second frame are fixed to each other by snap-fitting.

12. The card reader according to claim 10, further comprising a circuit board which is fixed to a side face of the main body frame in the thickness direction of the card,
wherein the circuit board is fixed to the main body frame by snap-fitting.

13. The card reader according to claim 1, further comprising a circuit board which is fixed to a side face of the main body frame in the thickness direction of the card,
wherein the circuit board is fixed to the main body frame by snap-fitting.

* * * * *